US006172180B1

(12) United States Patent
Hancock et al.

(10) Patent No.: US 6,172,180 B1
(45) Date of Patent: Jan. 9, 2001

(54) HIGHLY BRANCHED BLOCK COPOLYMERS

(75) Inventors: Lawrence F. Hancock, North Andover; Stephen M. Fagan, Newtonville; Claudy J.-P. Mullon, Framingham, all of MA (US)

(73) Assignee: Circe Biomedical, Inc., Lexington, MA (US)

(*) Notice: Under 35 U.S.C. 154(b), the term of this patent shall be extended for 0 days.

(21) Appl. No.: 09/140,284

(22) Filed: Aug. 25, 1998

(51) Int. Cl.$^7$ ..................................... C08G 75/23

(52) U.S. Cl. ............... 528/391; 525/56; 525/57; 525/58; 525/59; 525/90; 525/92 A; 525/92 B; 525/92 E; 525/92 H; 525/92 J; 525/92 M; 525/88; 525/93; 525/94

(58) Field of Search ...................... 528/391, 335, 528/360, 310, 370, 220, 421, 403, 392, 393, 396, 397, 373, 398, 345, 328; 526/345, 344, 341, 342, 317.1, 318.6, 310, 348, 307, 307.8, 255, 250, 277, 278, 287, 286, 303.1; 525/56, 57, 58, 59, 90, 92 A, 92 B, 92 E, 92 H, 92 J, 92 M, 88, 93, 94

(56) References Cited

U.S. PATENT DOCUMENTS

| 3,607,982 | 9/1971 | Winkler ................................ 260/880 |
| 4,568,737 | 2/1986 | Tomalia et al. ....................... 528/332 |
| 4,855,403 | 8/1989 | Meschke et al. ..................... 528/419 |
| 4,871,779 | 10/1989 | Killat et al. ............................ 521/28 |
| 5,136,014 | * 8/1992 | Figuly .................................... 528/272 |
| 5,567,795 | 10/1996 | Vicari et al. .......................... 528/206 |
| 5,589,563 | 12/1996 | Ward et al. ............................. 528/44 |
| 5,591,809 | 1/1997 | Vicari et al. .......................... 525/419 |
| 5,663,260 | 9/1997 | Frechet et al. ..................... 526/292.9 |
| 5,688,900 | * 11/1997 | Cooper et al. ........................ 528/301 |
| 5,700,902 | 12/1997 | Hancock et al. ..................... 528/373 |
| 5,700,903 | 12/1997 | Hancock et al. ..................... 528/373 |

FOREIGN PATENT DOCUMENTS 62-201603 9/1987 (JP).

OTHER PUBLICATIONS

Malstrom et al., "Hyperbranched Polymers: A Review", J.M.S.—Rev. Macromol. Chem. Phys., C37(3):555–579 (1997).

Walton et al., "Creation of Stable Poly(ethylene oxide) Surfaces on Poly(methyl methacrylate) Using Blends of Branched and Linear Polymers", Macromolecules 30:6947–6956 (1997).

Chen et al., "Surface Study of Diblock Copolymers of Poly (dimethylsiloxane) and Nylon–6 by Electron Spectroscopy for Chemical Analysis", Macromolecules, 27:2206–2210 (1994).

(List continued on next page.)

Primary Examiner—Margaret G. Moore
(74) Attorney, Agent, or Firm—Fish & Richardson P.C.

(57) ABSTRACT

The present invention relates to a block copolymer containing 1–50 first polymer segments and 1–50 second polymer segments. Each first polymer segment has an average mole fraction of monomers possessing a branch point of 0.0001 to 1, whereas each second polymer segment has an average mole fraction of monomers possessing a branch point of 0 to 0.5. The average molecular weights range from 5–2,000 kDa for the first polymer segments, which constitute 5–95% by weight of the block copolymer. The average molecular weights also range from 5–2,000 kDa for the second polymer segments, which constitute 5–95% by weight of the block copolymer. The ratio of the average mole fraction of monomers possessing a branch point of the second polymer segments to that of the first polymer segments is 0 to 0.5. An example of such a copolymer has ethylene oxide or ethylene oxide/propylene oxide as the first polymer segment and polysulfone as the second polymer segment. This block copolymer can further be blended with a bulk polymer.

71 Claims, 1 Drawing Sheet

OTHER PUBLICATIONS

Chen et al., "Surface Modification of Polymers by Blending Silozane Block Copolymers", Macromolecules, 27:3363–3369 (1994).

Chen et al., "Surface Morphology Studies of Multiblock and Starblock Copolymers of Poly($\alpha$–methylstyrene and Poly-(dimethylsiloxane)" Macromolecules 26:3778–3783 (1993).

Nakajima et al., "Adsorption Behaviour of Plasma Proteins on Polyaminoacid Membrane Surface", Polymer Journal 19(5):493–500 (1987).

Gido et al., "Synthesis, Characterization, and Morphology of Model Graft Copolymers with Trifunctional Branch Points", Macromolecules, 29:7022–7028 (1996).

Frechet, "Functional Polymers and Dendrimers: Reactivity, Molecular Architecture, and Interfacial Energy", Science, 263:1710–1715 (1994).

Oikawa et al., "Preparation of Graft Copolymers by Means of UV Photolysis of Poly(Methyl Vinyl Ketone) and Reverse Osmosis Performance of the Membranes from the Oximes of the Copolymers", J. Macromol. Sci.–Chem, A27(7):911–932 (1990).

* cited by examiner

A

B

C

D

HIGHLY BRANCHED BLOCK COPOLYMERS

BACKGROUND OF THE INVENTION

One useful attribute of block copolymers is their ability to combine the disparate properties of different materials into a single material. For example, a polymer of styrene-butadiene-styrene, a thermoplastic elastomer, draws its elastomeric qualities from the low glass transition, viscoelastic butadiene segments, and its dimensional stability and melting behavior from the high glass transition, rigid styrene segments. This combination of properties is achieved by arranging the constituent monomers in a particular sequential architecture, i.e., a so-called block copolymer.

An additional feature of block copolymers is their ability to localize at the interface of two materials thereby modifying the chemical and physical bond between the two. In order to localize in this manner, the block copolymer must be comprised of segments which have a specific chemical or physical affinity for the respective materials. This feature has been employed for the compatibilizing blends and improving adhesion.

The ability of certain polymer segments of block copolymers to localize at the air/material interface to thereby modify the surface has also been noted. In each instance, such a surface modification employs low surface energy polymer segments that are not highly branched to provide the physical driving force to enrich the surface with these polymer segments.

SUMMARY OF THE INVENTION

The present invention provides polymers, which by virtue of their composition and architecture, unexpectedly modify the surface of an article that contains these polymers. The present invention generally provides a block copolymer having 1 to 50 first polymer segments, each first polymer segment having monomers possessing a branch point of 0.0001 to 1 and an average molecular weight range of 5 to 2,000 kDa, and 1 to 50 second polymer segments, each second polymer segment having an average mole fraction of monomers possessing a branch point of 0 to 0.5 and an average molecular weight range of 5 to 2,000 kDa. The first polymer segments are 5 to 95% by weight of the block copolymer, and the second polymer segments are 5 to 95% by weight of the block copolymer. The ratio of the average mole fraction of monomers possessing a branch point of the second polymer segments to the average mole fraction of monomers possessing a branch point of the first polymer segments is 0 to 0.5. The block copolymer may have 1 to 10, 1 to 5, or 1 to 2 first polymer segments. The first polymer segments may be terminally or internally located in the block copolymer. Likewise, the block copolymer may have 1 to 10, 1 to 5, or 1 to 2 second polymer segments. The second polymer segments may be terminally or internally located. More specifically, the block copolymer has 1 to 2 first polymer segments, and 1 to 2 second polymer segments.

In a particular example, the block copolymer may have a total molecular weight of 10 to 2,000 kDa. The molecular weight may be determined by gel permeation chromatography, viscometry, light scattering, osmometry or any other proper methods.

The first polymer segment may be poly(ethylene oxide), poly(propylene oxide), ethylene oxide/propylene oxide copolymer, poly(acrylic acid), poly(methacrylic acid), poly(acryl amide), poly(vinyl alcohol), poly(vinyl sulfonic acid), poly(styrene sulfonate), polycarbonate, polyolefin, poly(vinyl phosphoric acid), poly(ethylene imine), poly(amino acid), or mixture thereof. The second polymer segment may be polycarbonate, polyolefin, polysulfone, polyethersulfone, polyetherketone, polyimide, polysulfonamide, polyamide, polyacrylonitrile, polyacrylonitrile/polyvinychloride copolymer, poly(vinylidene fluoride), fluoropolymer, or a mixture thereof.

One example of the copolymer of the present invention is a block copolymer in which the first polymer segment is poly(ethylene oxide) or ethylene oxide/propylene oxide copolymer and the second polymer segment is polysulfone. The block copolymer includes (i) 1–3 first polymer segments, each first polymer segment having an average mole fraction of monomers possessing a branch point of 0.0001 to 1 and an average molecular weight range of 5 to 200 kDa, and (ii) 1–3 second polymer segments, each second polymer segment having an average mole fraction of monomers possessing a branch point of 0 and an average molecular weight range of 20 to 200 kDa. The first polymer segments are 20 to 60% by weight of the block copolymer, and the second polymer segments are 40 to 80% by weight of the block copolymer.

The present invention additionally provides an article having an aggregate of block copolymer molecules, the block copolymer molecules having 1 to 50 first polymer segments, each first polymer segment having an average mole fraction of monomers possessing a branch point of 0.0001 to 1 and an average molecular weight range of 5 to 2,000 kDa, and 1 to 50 second polymer segments, each second polymer segment having an average mole fraction of monomers possessing a branch point of 0 to 0.5 and an average molecular weight range of 5 to 2,000 kDa. The first polymer segments are 5 to 95% by weight of the block copolymer, and the second polymer segments are 5 to 95% by weight of the block copolymer. The ratio of the average mole fraction of monomers possessing a branch point of the second polymer segment to that of the first polymer segment is 0 to 0.5.

The article may contain block copolymer molecules wherein the first polymer segment is poly(ethylene oxide), poly(propylene oxide), ethylene oxide/propylene oxide copolymer, poly(acrylic acid), poly(methacrylic acid), poly(acryl amide), polyvinyl alcohol, poly(vinyl sulfonic acid), poly(styrene sulfonate), poly(vinyl phosphoric acid), poly(ethylene imine), poly(amino acid) or mixture thereof; and wherein the second polymer segment is polycarbonate, polyolefin, polysulfone, polyethersulfone, polyetherketone, polyimide, polysulfonamide, polyamide, polyacrylonitrile, polyacrylonitrile/polyvinychloride copolymer, poly(vinylidene fluoride), fluoropolymer, or mixture thereof.

The article may further contain a bulk polymer wherein the second polymer segments are miscible with the bulk polymer. The bulk polymer may be polycarbonate, polyolefin, polysulfone, polyethersulfone, polyetherketone, polyimide, polysulfonamide, polyamide, polyacrylonitrile, polyacrylonitrile/polyvinychloride copolymer, poly(vinylidene fluoride), or fluoropolymer. In one embodiment, the article contains a bulk polymer of polysulfone, and each of the second polymer segments of the block copolymer is polysulfone.

The present invention also provides a solution for preparing a polymer article. The solution having 0.5 to 80% by weight of block copolymer molecules and 20 to 99.5% by weight of a solvent. The block copolymer molecules are dissolved in the solvent and each of these molecules has 1 to 50 first polymer segments, each first polymer segment having an average mole fraction of monomers possessing a branch point of 0.0001 to 1 and an average molecular weight range of 5 to 2,000 kDa; and 1 to 50 second polymer segments, each second polymer segment having an average mole fraction of monomers possessing a branch point of 0 to 0.5 and an average molecular weight range of 5 to 2,000 kDa. The first polymer segments are attached by covalent bonding to the second polymer segments. The first polymer segments are 5 to 95% by weight of the block copolymer, and the second polymer segments are 5 to 95% by weight of the block copolymer. The ratio of the average mole fraction of monomers possessing a branch point of the second polymer segment to that of the first polymer segment is 0 to 0.5.

The solution for preparing the polymer article may have 1 to 50% or 1 to 30% by weight of block copolymer molecules. The first polymer segment of block copolymer molecules may be poly(ethylene oxide), poly(propylene oxide), ethylene oxide/propylene oxide copolymer, poly(acrylic acid), poly(methacrylic acid), poly(acryl amide), poly(vinyl alcohol), poly(vinyl sulfonic acid), poly(styrene sulfonate), poly(vinyl phosphoric acid), poly(ethylene imine), poly(amino acid), or mixture thereof. The second polymer segment of block copolymer molecules may be polycarbonate, polyolefin, polysulfone, polyethersulfone, polyetherketone, polyimide, polysulfonamide, polyamide, polyacrylonitrile, polyacrylonitrile/polyvinychloride copolymer, poly(vinylidene fluoride), fluoropolymer, or a mixture thereof. The block copolymer may also have a molecular weight range of 5 to 1,000 kDa or 5 to 500 kDa.

The solution may further comprise a bulk polymer wherein the second polymer segments are miscible with the bulk polymer. The bulk polymer may be polycarbonate, polyolefin, polysulfone, polyethersulfone, polyetherketone, polyimide, polysulfonamide, polyamide, polyacrylonitrile, polyacrylonitrile/polyvinylchloride copolymer, poly(vinylidene fluoride), or fluoropolymer.

More specifically, the solution may be a casting solution for preparing a membrane. The casting solution includes: (i) 2 to 60% by weight of a bulk polymer having one or more polysulfone segments, e.g., a polysulfone; (ii) 0.05 to 80% by weight of a block copolymer having a first polymer segment of poly(ethylene oxide) or ethylene oxide/propylene oxide copolymer having an average mole fraction of monomers possessing a branch point of 0.0001 to 1 and an average molecular weight range of 5 to 200 kDa, and a second polymer segment of polysulfone having an average mole fraction of monomers possessing a branch point of 0 to 0.5 and an average molecular weight range of 20 to 200 kDa; and (iii) 20 to 98% by weight of a solvent. The bulk polymer has a molecular weight of 10 to 2,000 kDa. The block copolymer has a molecular weight of 20 to 150 kDa and contains 0.01 to 95% by weight of the first polymer segment. The ratio of the average mole fraction of monomers possessing a branch point of the second polymer segment to that of the first polymer segment is 0 to 0.5.

The bulk polymer in the casting solution may be polysulfone. The casting solution may contain 5 to 40% or 5 to 30% by weight of the bulk polymer. The bulk polymer may have a molecular weight of 15 to 1,000 kDa or 20 to 750 kDa.

The casting solution may contain 1 to 50% or 1 to 30% by weight of the block copolymer.

The casting solution may contain a solvent that is aprotic and water miscible. Specifically, the solvent may be N-methylpyrrolidone, formamide, dimethylformamide, dimethylsulfoxide, dimethylacetylacetamide, or 4-butyrolactone.

The block copolymer component of the casting solution may contain 5 to 70% or 10 to 50% by weight of the first polymer segment.

Some important terms used in this disclosure are defined or exemplified below:

By "average mole fraction of monomers possessing a branch point" is meant the mole fraction of monomer units in a polymer segment whose chemical structure presents at least three points of connectivity, thereby creating additional polymer chains which branch away from the primary polymer chain. The average mole fraction is calculated by determining the total number of monomers possessing a branch point (by for example, NMR, UV-Vis, FTIR, or some other quantifiable analytical techniques) and dividing that number by the total number of monomers in the polymer segment.

By "polymer segment" is meant a continuous sequence of covalently linked monomer units of the same chemical composition or chemical architecture.

By "block copolymer" is meant two or more polymer segments that are covalently bonded.

By "miscibility of one polymer segment with another polymer segment or polymer" is meant the ability of one polymer segment to mix with another polymer segment or polymer to form a single phase as determined by various techniques including microscopy (light or electron), differential scanning calorimetry, dielectric spectroscopy and light scattering.

The term "immiscible polymer blends", means those polymer blends that exhibit two or more phases at all compositions and temperature.

The term "partially miscible polymer blends" means a sub-class of polymer blends including those blends that exhibit a "window" of miscibility, i.e., are miscible only at some concentrations and temperature.

The term "phase inversion" is meant a change in the physical state of matter when acted upon by a particular process, e.g., the phenomenon when a liquid polymer casting solution forms a solid polymer membrane.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. All publications, patent applications, patents, and other references mentioned herein are incorporated by reference in their entirety. In case of conflict, the present specification, including definitions, will control. In addition, the materials, methods, and examples are illustrative only and not intended to be limiting.

Other features or advantages of the present invention will be apparent from the following drawing and detailed description of several embodiments, and also from the appending claims.

DETAILED DESCRIPTION OF THE INVENTION

One novel feature of the present invention is the particular highly branched block copolymer architectures of the compositions. These compositions form durable, thermally stable surface structures. These architectures include diblock, triblock and multiblock polymers where the surface modifying block possesses a dendritic or highly branched structure and the matrix forming block is linear or lightly branched. The branched architecture of one constituent block renders it surface active. That is, the highly branched block is enriched at the surface of the polymer article. As a consequence, specific material properties of the highly branched block are expressed at the surface of the article while the bulk matrix of the article retains the material properties of the matrix block. The relative proportion of branching necessary to render a material surface active will depend in part on the relative miscibility of the two polymer segments. In particular, it is expected that higher mole fraction of branch points will be needed to affect surface activity in a material composed of two miscible materials as compared to a material composed of two immiscible materials.

The present invention provides branched block copolymer architectures that can be used as surface modifying agents for polymer membranes, foams and extruded, molded and thermoformed articles. The compositions are particularly useful for the fabrication of porous materials (e.g., filtration membranes) where the creation of surface is critical to manufacture and the composition of the surface is critical to function. Particular examples include blood contacting filtration membranes for dialysis, plasmapheresis, membrane oxygenation and bioartificial organs. Compositions are also of utility in molding and extrusion applications where the surface character of the final article is critical. Examples of molded or extruded items include blood contacting articles such as tubing for blood lines, dialyser housings, catheters and stents. Additional applications include those where interfacial adhesion is critical such as extruded fiber for fiber reinforced composites.

A block constituent with a branched architecture becomes surface active in that it will spontaneously organize at the air interface of a polymer membrane or article. This effect can be used to bring constituents with an equivalent or higher surface energy to the surface. This overcomes limitations of simple linear block copolymers where only the lower surface energy component could be enriched at the surface.

Figure 1:
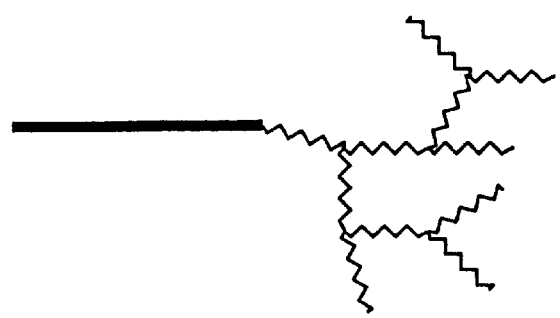
FIG. 1 is a schematic depiction of the architecture of branched block copolymers of the present invention.
Figure 1:
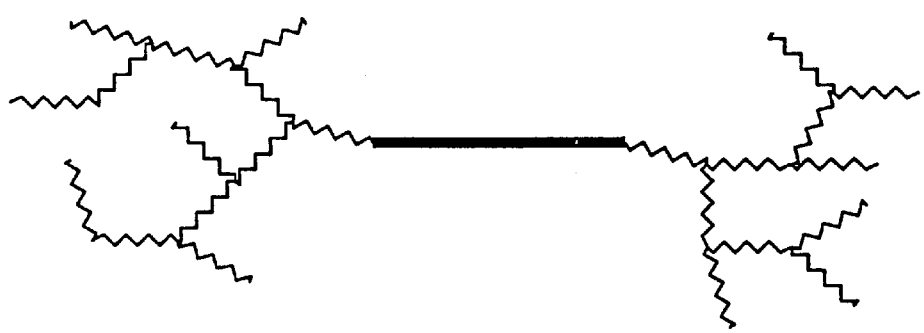
Figure 1:
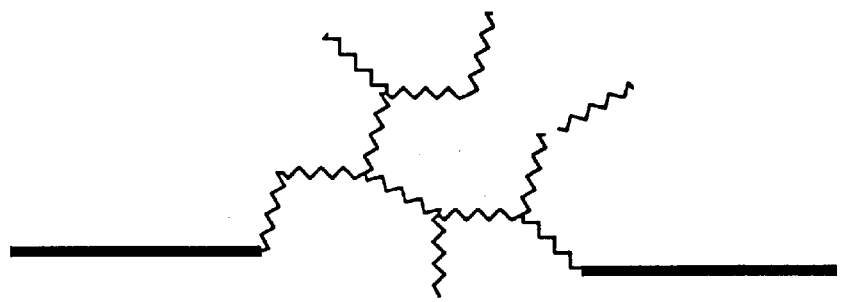
Figure 1:
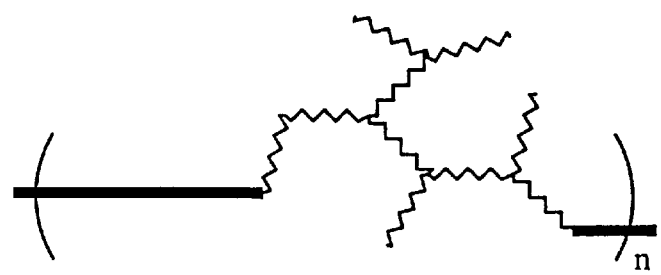

The architectural elements of branched block copolymers define their utility for the surface modification of polymer membranes and other manufactured polymer articles. Examples of suitable architectures are shown in FIG. 1. These include diblock (A) or triblock (B) structures where branching in terminal polymer segment(s) render them surface active. Triblock structures where the internal segment is branched (C) and multiblock structures (D) will also be useful provided they have an appropriate number and density of branch points. What is meant by "active surface" means the total surface area, including pores and channels, exposed to a filtrate. The invention features block copolymers designed to form polymer articles such as membranes which undergo a phase inversion to form an active surface. As a result of the design of the block copolymer and the method of formation, the active surface generally extends across the exterior membrane faces and generally extends through the interior pore surfaces and channels. The active surface of an article is therefore generally greater than the macroscopic or planar dimension. Thus, a 4-inch by 4-inch membrane has an active surface greater than 16 square inches. Useful techniques for analyzing the surface include X-ray photoelectron spectroscopy, time of flight secondary ion mass spectrometry, attenuated total reflectance Fourier Transform infrared spectroscopy, solid liquid contact angle, as well as observation of wetting behavior and water absorption.

The degree of branch points within this class of materials is physically manifested in multifold ways. The number and density of branch points affects the miscibility of the block copolymer segments. Increasing the density of branch points increases the monomer density per unit volume of the polymer which limits the solubility of other molecules (especially polymers) within the branched polymer. This enhances the thermal and mechanical stability of the multiphase system where the branched component is localized at the surface of the polymer article. In addition, an increase in branch points would definitely result in an increase in the number of chain ends. Chain ends are a relatively high free volume element of the polymer architecture. In order to relieve the high monomer density of the branched segment and to accommodate the high free volume demands of the increased number of chain ends, the branched block copolymer segment prefers to localize at the air interface of the polymer article.

The remaining linear block is also critical to the surface modifying action of the branched block copolymer. The linear block either forms the bulk, load bearing polymer matrix of the article or it anchors the branched surface modifying block to the bulk matrix of the polymer article. This function is critical to the mechanical stability of the surface modification and to its stability to aggressive environments. For example, poly(ethylene oxide) (PEO) is soluble in aqueous environments. In an aqueous environment, a PEO surface modification may dissolve and leach from the surface into the aqueous medium. Covalent attachment of the PEO block to a matrix forming material which is insoluble in the aqueous environment anchors it to the article's surface. If the branched block copolymer is to be used in mixtures with a second bulk polymer, it is important that the linear block be compatible with the second polymer, and preferably miscible with it. Furthermore, it is preferable that the molecular weight of the linear block be comparable or larger than the molecular weight of the second bulk polymer.

The unique features of branched block copolymers include: 1) the ability to form stable phase inversion casting solutions with higher PEO compositions and higher total solids, 2) the ability to form surface modified articles with a constituent of an equivalent or higher surface energy than the bulk material, 3) the ability to form surface modifications which are stable at high temperatures or under mechanical stress, and 4) the ability to control the concentration and density of surface functional groups at an article's surface.

Without further elaboration, it is believed that the above description has adequately enabled the present invention. The following specific examples are, therefore, to be construed as merely illustrative, and not limitative of the remainder of the disclosure in any way whatsoever.

The following examples describe branched poly(ethylene oxide)-polysulfone block copolymers (branch-PEO-block-PSF) where branching within the poly(ethylene oxide) blocks renders them surface active. The synthetic method for fabrication of branch-PEO-block-PSF is described below.

Branch-PEO-Block-PSF Copolymers

The following depicts a synthetic method for the preparation of branch-PEO-block-PSF, which includes three steps: (1) polysulfone prepolymerization, (2) PEO prepolymerization, and (3) branch-PEO-block-PSF formation.

(1) Polysulfone Prepolymerization
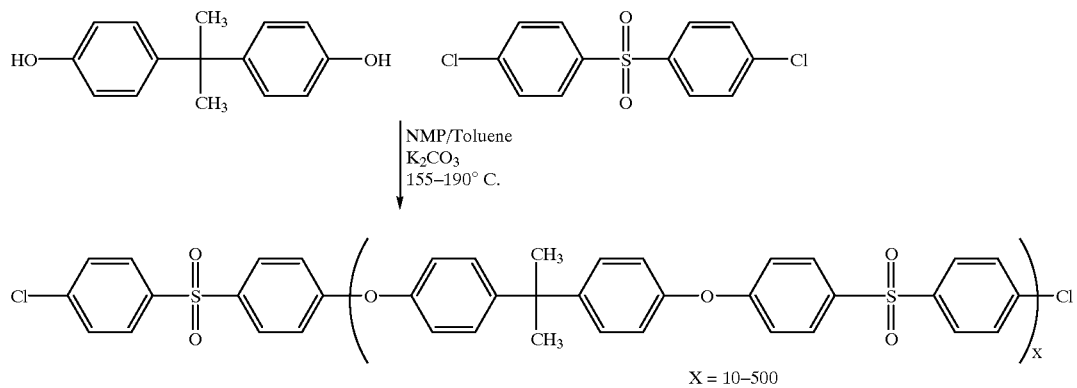
(2) PEO Prepolymerization
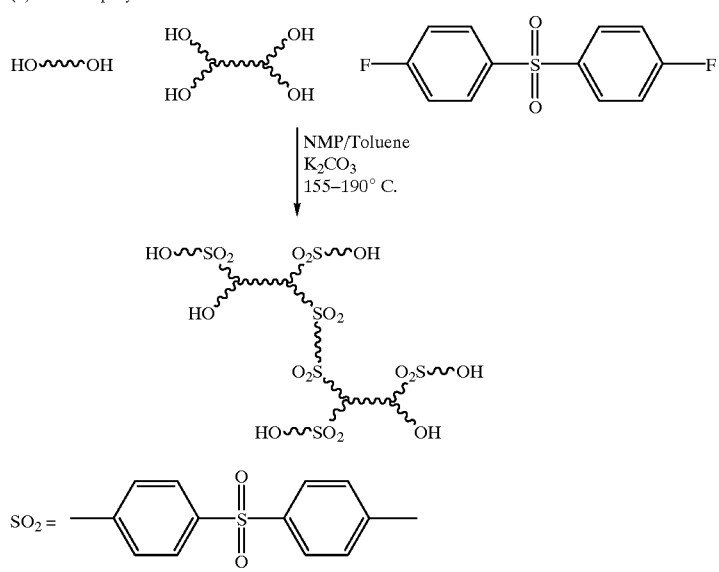
(3) branch-PEO-block-PSF Formation
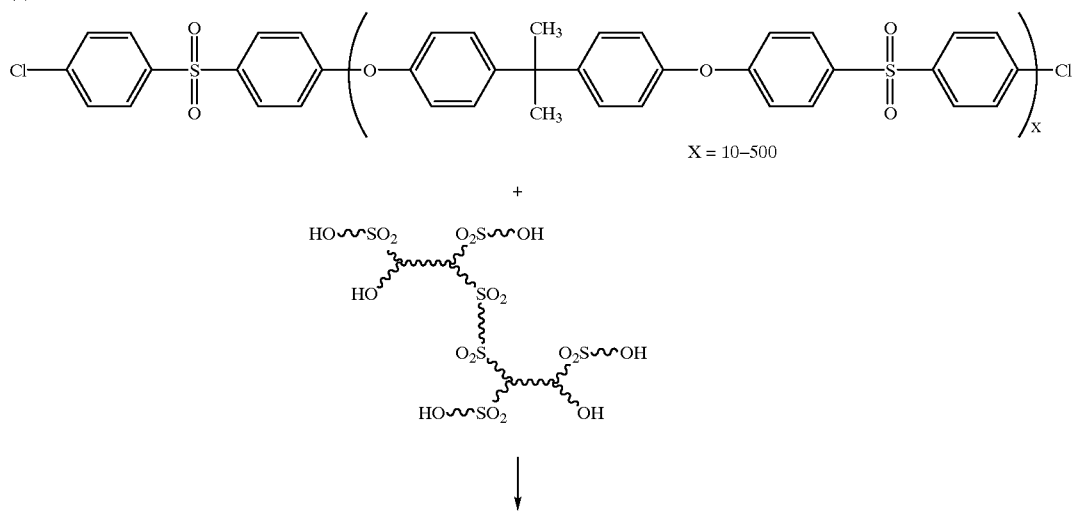

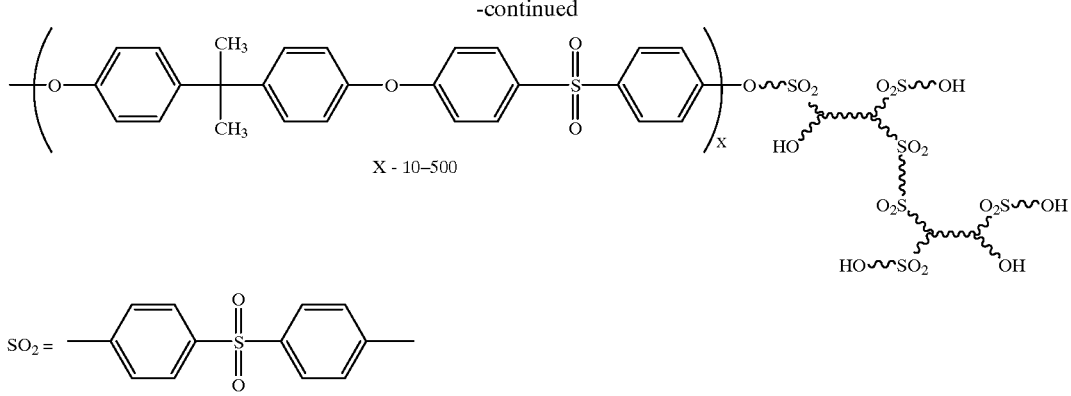

$SO_2 =$

More specifically, the synthesis includes the preparation of a polysulfone prepolymer of a controlled molecular weight with chemically defined endgroups, e.g., —Cl. This is achieved with a controlled excess of bis(4-chlorophenyl) sulfone in the polymerization. A second prepolymerization prepares the branched poly(ethylene oxide) segment. Here, hydroxyl monomers including a multifunctional reagent are reacted with bis(4-fluorophenyl)sulfone.

The degree of "branching" (i.e., the mole fraction of branch points) is controlled during polymerization by the amount of multifunctional hydroxyl monomer and the number of hydroxyl units the monomer contains (i.e., triol which incorporates 1 branch point; tetranol, 2 branch points). The molecular weight of the PEO segment is controlled by the ratio of hydroxyl groups derived from the multifunctional reagent to the total number of hydroxyl groups, and by the ratio of the total number of hydroxyl groups to the total number of fluorophenyl groups. In a final step, the two prepolymers are reacted to form the branched block copolymer.

Branch-PEO-Block-PSF Membranes

Poly(ethylene oxide)/polysulfone branched block copolymers are readily employed in the fabrication of microporous phase-inversion membranes. Branch-PEO-block-PSF forms clear homogeneous solutions in a number of solvents suitable for membrane manufacture including 4-butyrolactone, N-methylpyrrolidinone, dimethylformamide, formamide, diemthylsulfoxide, and others. Branched block copolymer of 0.05–80% poly(ethylene oxide) by weight or more commonly 10–50% PEO by weight can be used either by itself or blended with polysulfone homopolymer. Homogeneous casting solutions can be obtained with 2–50% branch-PEO-block-PSF and polysulfone individually or in combination. More commonly 10–40% combined solids. Pore formers including lower molecular weight alcohols, polyethylene glycols, water soluble polymers (e.g., polyvinylpyrrolidinone, poly(acrylic acid), polyacrylamide, etc.), and inorganic salts are also tolerated. Membranes may be formed in either a flat sheet or hollow fiber format. Membrane permeability and pore size may be controlled as is commonly found in the art (i.e., formulation, composition and temperature of the coagulation medium, and manufacturing parameters).

Of particular interest is a hollow fiber membrane prepared from a casting solution composed of 12% polysulfone (Amoco, Udel 3500), 8% branch-PEO-block-PSF (30–35% by weight PEO), 10% poly(ethylene glycol) (v400Da, Baker), and 70% N-methylpyrrolidinone. The solution is extruded through a spinneret directly into a coagulation medium of 60% N-methylpyrrolidinone, 20% isopropanol, and 20% water. The open core of the hollow fiber membrane is simultaneously formed by a coextruded stream of coagulation medium. The resulting hollow fiber membrane is microporous with inner surface pores or 0.2–0.5 microns and outer surface pores of 0.1–0.4 microns. The wall structure is spongy and homogenous. A static protein permeability test of the membrane yielded 80–90% protein passage of bovine serum.

The following examples describe the syntheses and characterization of 2 branch-PEO-block-PSF copolymers, 4PTPF-H and 4PTPF-J, which are within the scope of this invention. The syntheses of 4 control copolymers, PMX50S-A, PMX30S-B, PMX4051-C, and PMX30-5Z are also described herein. All of the control copolymers are linear-PEO-block-PSF copolymers. Each of the copolymers was then formulated into a polymer membrane and evaluated for its thermal stability.

Synthesis of 4PTPF-H and 4PTPF-J

4PTPF-H was prepared in a two-step polymerization. In the initial step, polysulfone and branched poly(ethylene oxide) prepolymers were prepared separately. In the second step of the reaction, the two prepolymers were combined in a single reactor and reacted further to affect block copolymer formation.

The polysulfone prepolymer was prepared by charging 58.0 g bisphenol A, 73.7 g 4-chlorophenyl sulfone, 105.4 g $K_2CO_3$, 260 ml N-methyl-2-pyrrolidinone (NMP), and 125 ml toluene to a 1 liter resin kettle equipped with a high speed dispersion stirrer and a continuous argon purge. The mixture was heated to 155° C. and maintained at that temperature for 4 hours. At that temperature, a refluxing toluene/water azeotrope was formed from the mixture. The azeotropic reflux allowed water to be removed from the reaction with the aid of a Dean-Stark trap. The reaction mixture was then heated to 190° C. and toluene removed from the reaction mixture by distillation. The reaction was maintained at 190° C. for 4 hours to affect polymerization.

The branched poly(ethylene oxide) prepolymer was prepared by charging 62.2 g 4 kDa poly(ethylene glycol); 12.8 g Tetronic 304; 100.1 g $K_2CO_3$; 175 ml NMP; and 98 ml toluene to a 1 liter resin kettle equipped with a high speed dispersion stirrer and a continuous argon purge. The mixture was heated to 155° C. and maintained at that temperature for 4 hours. At that temperature, a refluxing toluene/water azeotrope was formed from the mixture. The azeotropic reflux allowed water to be removed from the reaction with the aid of a Dean-Stark trap. After 4 hours, 4.7 g 4-fluorophenyl sulfone was added to the reaction mixture and the temperature was increased to 190° C. Toluene was distilled from the reaction mixture as the temperature increased. The reaction was maintained at 190° C. for 6 hours to affect polymerization.

The poly(ethylene oxide) prepolymer was added to the polysulfone prepolymer in the 1 liter resin kettle. The mixture was heated to 190° C. and maintained at that temperature for 8 hours. At the conclusion of the reaction the mixture was allowed to cool to room temperature. The polymer was isolated by precipitation in water. The precipitation mixture was neutralized with HCl, washed with water, recovered by filtration and dried in a convection oven at 60° C.

Similar to the synthesis of 4PTPF-H, another branch-poly (ethylene oxide)-block-polysulfone block copolymer, 4PTPF-J, was also prepared in a two-step polymerization.

The polysulfone prepolymer was prepared by using 206.4 g bisphenol A, 261.9 g 4-chlorophenyl sulfone, 374.8 g $K_2CO_3$, 940 ml NMP, and 450 ml toluene as described above.

The branched poly(ethylene oxide) prepolymer was also prepared described above, except that 331.6 g 4 kDa poly (ethylene glycol), 68.4 g Tetronic 304, 114.7 g $K_2CO_3$, 400 ml NMP, and 155 ml toluene were used. 25.305 g 4-fluorophenyl sulfone was then added to the reaction mixture after the mixture was reacted for 4 hours in the resin kettle and the reaction proceeded in the same fashion as set forth above.

The poly(ethylene oxide) prepolymer was then added to the polysulfone prepolymer in the 4 liter resin kettle. The mixture was heated to 190° C. and maintained at that temperature for 8 hours. At the conclusion of the reaction the mixture was allowed to cool to room temperature. The polymer was isolated by precipitation in water. The precipitation mixture was neutralized with HCl, washed with water, recovered by filtration and dried in a convection oven at 60° C.

The branching characteristics of 4PTPF-H and 4PTPF-J are summarized in Table 1.

TABLE 1

Stoichiometric characteristics of branch-PEO-block-PSF as obtained from $^1$H NMR analysis.

| | PEO Segment | | PSF Segment | |
|---|---|---|---|---|
| Sample fraction | Mw | average mole fraction of branch points | Mw | average mole fraction of branch points |
| 4PTPF-H | 10 kDa | 0.0092 | 100 kDa | 0 |
| 4PTPF-J | 10 kDa | 0.0085 | 100 kDa | 0 |

The average mole fraction of branch points were calculated from the $^1$H NMR spectra of 4PTPF-H and 4PTPF-J. The branched reactant, Tetronic 304 (MW 1650), included two branch points and was comprised of a mixture of ethylene oxide and propylene oxide monomers (49% ethylene oxide, 51% propylene oxide). Therefore, there were 0.138 branch points per propylene oxide monomer (2 branch points / (1650 g/mole×0.51/58.06 g/mole propylene oxide)). The propylene oxide monomers were unique to the branched reactant and their methyl substituent was observable in the $^1$H NMR spectra at $\delta 1.14$. Using 4PTPF-J as an example, the number of polypropylene oxide monomers equaled the $\delta 1.14$ integral divided by 3 H's per propylene oxide monomer, i.e., 37.4/3 =12.5. The number of branch points then was the number of propylene oxide monomers times 0.138 branch points per propylene oxide monomer, i.e., 12.5×0.138=5961.725. Ethylene oxide monomers were observed at $\delta 3.6$ in the $^1$H NMR spectra. The number of ethylene oxide monomers was calculated from the $\delta 3.6$ integral divided by 4 H's per ethylene oxide monomer, i.e., 758/4=189.5. The average mole fraction of branch points per monomer was then the number of branch points divided by the total number of ethylene oxide and propylene oxide monmers, i.e., 1.725/(189.5+12.5)=0.0085. The average mole fraction of branch points for 4PTPF-H was calculated similarly with the $\delta 1.18$ integral of 2.71 and the $\delta 3.6$ integral of 50.9 to gave 0.0092.

Synthesis of PMX50S-A, PMX30S-B, PMX4051-C and PMX30-5Z

Poly(ethylene oxide) polysulfone block copolymers PMX50S-A, PMX30S-B, PMX4051-C, and PMX30-5Z were prepared in a single-step polymerization. The starting materials are summarized in Table 2. The polymerization was affected in two stages. First the reaction mixture was heated to 155–175° C. where a toluene/water azeotrope was distilling from the mixture. The distillate was allowed to reflux and water was removed from the system using a Dean-Stark trap. After 2 to 4 hours, the reaction temperature was increased to 190° C. and toluene was removed from the reactor. Polymerization occured in the second stage of the reaction at 190° C. as evidenced by an increase in the viscosity of the reaction mixture. At the conclusion of the polymerization, the viscous polymer solution was allowed to cool to room temperature. The block copolymer was isolated by precipitation in water. Residual base was neutralized by titration with HCl. The polymer was washed with water, recovered by filtration and dried in a convection oven at 60° C.

TABLE 2

Starting Materials Used in the Synthese of the Copolymer Controls

| Sample | PEO | Bisphenol A | Chlorophenyl Sulfone | $K_2CO_3$ | NMP/ Toluene |
|---|---|---|---|---|---|
| PMX50S-A | 290.3 g 10 kDa PEG 32.3 g 5 kDa Me-PEG | 162.8 g | 214.1 g | 309.1 g | 1500/600 ml |
| PMX30S-B | 174.1 g 10 kDa PEG 19.4 g 5 kDa Me-PEG | 230.8 g | 295.9 g | 427.2 g | 1500/600 ml |
| PMX4051-C | 258.0 g 1500/600 ml 8.75 kDa EO/PPO | 196.4 g | 255.5 g | 368.9 g | 1500/600 ml |
| PMX30-5Z | 193.5 g 5 kDa Me-PEG | 230.8 g | 295.9 g | 427.2 g | 1500/600 ml |

NMP - N-Methyl-2-pyrrolidinone
10 kDa PEG - 10,000 MWt Poly(ethylene glycol) (Fluka Chemika)
5 kDa Me-PEG - 5,000 MWt Poly(ethyelen glycol) mono-methyl ether (Polysciences)
8.75 kDa PEO/PPO - 8,750 MWt Poly(ethylene oxide) poly(propylene oxide) random copolymer (Polysciences)

The architecture and material characteristics of 4PTPF-H, 4PTPF-J, PMX50S-A, PMX30S-B, PMX4051-C, and PMX30-5Z are summarized collectively in Table 3. Tests were conducted to ensure they had comparable weight % PEO and molecular weights.

TABLE 3

Architecture and material characteristics of poly(ethylene oxide) - polysulfone block copolymers.

| Sample | Architecture | % PEO[1] | Mn[2] | Mw[2] |
|---|---|---|---|---|
| 4PTPF-H | branch-PEO-block-PSF | 35% | 35 | 86 |
| 4PTPT-J | branch-PEO-block-PSF | 44% | 34 | 80 |
| PMX50S-A | linear segmented blocks PEO-block-(PSF-block-PEO)$_n$ | 49% | 32 | 54 |
| PMX30S-B | linear segmented blocks PEO-block-(PSF-block-PEO)$_n$ | 25% | 55 | 94 |
| PMX4051-C | linear segmented blocks PEO/PPO-block-(PSF-block-PEO/PPO)$_n$ | 40% | 37 | 62 |
| PMX30-5Z | linear triblock PEO-block-PSF-block-PEO | 26% | 48 | 70 |

PEO stands for poly(ethylene oxide). PPO stands for poly(propylene oxide).
[1]Weight % PEO obtained from $^1$H NMR.
[2]Molecular weights obtained via gel permeation chromatography. Samples eluted through 2 PLgel minimix C columns with 0.1 M LiBr dimethylformamide at 40° C. The columns were obtained from Polymer Laboratories, Inc., Amherst, MA. Molecular weight averages are based upon narrow poly(methyl methacrylate) standards.
$Mn = \Sigma N_x M_x / \Sigma N_x$   $Mw = \Sigma N_x M_x^2 / \Sigma N_x M_x$, wherein $N_x$ is the total number of molecules of length "x" and $M_x$ is the molecular weight of molecules of length "x" (see, e.g., P. C. Painter and M. C. Coleman, "Fundamentals of Polymer Science," second edition, page 16.)

Formulation and Evaluation of Membranes Prepared from 4PTPF-H, 4PTPF-J, PMX50S-A, PMX30S-B, PMX4051-C, & PMX30-5Z Each material listed in Table 3 was formulated into a membrane casting solution which contained 15% by weight poly(ethylene oxide)/polysulfone block copolymer, 10% by weight polysulfone (Amoco, Udel 3500) and 75% by weight N-methylpyrrolidinone. A 0.006 inch coat was cast onto a glass plate with a retractable doctor blade. The plate was then immersed into a coagulating solution which consisted of 75% N-methylpyrrolidinone and 25% water (v/v) at room temperature. The plate was removed after four minutes and transferred to a room temperature water bath. After the membranes were soaked free of solvent (~2 hour), they were annealed in an 85° C. water bath for 4 hours. The membranes were finally dried in a 65° C. convection oven overnight.

Strips of dry membrane approximately 1-inch×5-inch were cut to evaluate their wetting behavior as a function of thermal treatment. Membrane samples were placed in a dry air convection oven at 145–150° C. Once removed from the oven, they were cooled to room temperature and then spotted with deionized water. A qualitative rate of adsorption of water into the microporous, glass facing side of the membrane was recorded as the experimental observation. Results are summarized in Table 4.

As shown in Table 4, microporous membranes prepared from 4PTPF-H and 4PTPF-J, compared with those prepared from PMX50S-A, PMX30S-B, and PMX30-5Z, unexpectedly retained wettability even after extended thermal exposure in a 145–150° C. convection oven. Notably, these materials retained their wettability at a temperature very near the melting point of the materials, as significant melting was observed in the membrane on extended exposure. Segmented block copolymers (PMX50S-A and PMX30S-B) and a linear triblock copolymer (PMX30-5Z) lost wettability after a 2 hour period at 145–150° C. in a dry air oven.

TABLE 4

Wetting behavior of poly(ethylene oxide)/polysulfone block copolymer membranes as a function of time at 145–150° C. in a dry air oven.

| | Cumulative Thermal Exposure | | | |
|---|---|---|---|---|
| Sample | 30 minutes | 1 hour | 2 hours | 15 hours |
| 4PTPF-H | rapid & thorough | rapid & thorough | rapid & thorough some melt | ~50% melt, remainder wets rapid & thorough |
| 4PTPF-J | rapid & thorough | rapid & thorough | rapid & thorough some melt | ~50% melt, remainder wets rapid & thorough |
| PMX50S-A | rapid & thorough | rapid & thorough | no wetting | no wetting |
| PMX30S-B | no wetting | no wetting | no wetting | no wetting |
| PMX30-5Z | rapid & thorough | rapid & thorough | no wetting | no wetting |

Other Embodiments

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

All of the features disclosed in this specification may be combined in any combination. Each feature disclosed in this specification may be replaced by an alternative feature serving the same, equivalent, or similar purpose. Thus, unless expressly stated otherwise, each feature disclosed is only an example of a generic series of equivalent or similar features.

Furthermore, from the above description, one skilled in the art can easily ascertain the essential characteristics of the present invention, and without departing from the spirit and scope thereof, can make various changes and modifications of the invention to adapt it to various usages and conditions. Thus, other embodiments are also within the claims. For example, desirable surface characteristics such as low friction, non-stick, abrasion resistance or high gloss can be imparted by incorporating an appropriately designed branched block copolymer. Self-healing surfaces in which the branched, surface active constituent is liquid crystalline can also be made.

What is claimed is:

1. A block copolymer comprising
   1 to 50 first polymer segments, each first polymer segment having an average mole fraction of monomers possessing a branch point of 0.0001 to 1 and an average molecular weight range of 5 to 2,000 kDa; and
   1 to 50 second polymer segments, each second polymer segment having an average mole fraction of monomers possessing a branch point of 0 to 0.5 and an average molecular weight range of 5 to 2,000 kDa, wherein the first polymer segments are 5 to 95% by weight of the block copolymer, the second polymer segments are 5 to 95% by weight of the block copolymer, the ratio of the average mole fraction of monomers possessing a branch point of the second polymer segments to that of the first polymer segments is 0 to 0.5, and the first polymer segments are more hydrophilic than the second polymer segments;

wherein the first polymer segment is poly(ethylene oxide), poly(propylene oxide), ethylene oxide/propylene oxide copolymer, poly(acrylic acid), poly(methacrylic acid), poly(acryl amide), poly(vinyl alcohol), poly(vinyl sulfonic acid), poly(styrene sulfonate), poly(vinyl phosphoric acid), poly(ethylene imine), poly(amino acid), or a mixture thereof.

2. The block copolymer of claim 1 comprising 1 to 10 first polymer segments.

3. The block copolymer of claim 1 comprising 1 to 5 first polymer segments.

4. The block copolymer of claim 1 comprising 1 to 2 first polymer segments.

5. The block copolymer of claim 4 wherein at least one of the first polymer segments is terminally located.

6. The block copolymer of claim 1 comprising 1 to 10 second polymer segments.

7. The block copolymer of claim 1 comprising 1 to 5 second polymer segments.

8. The block copolymer of claim 1 comprising 1 to 2 second polymer segments.

9. The block copolymer of claim 8 wherein at least one of the second polymer segments is terminally located.

10. The block copolymer of claim 4 comprising 1 to 2 second polymer segments.

11. The block copolymer of claim 1 which has a molecular weight of 10 to 2,000 kDa.

12. The block copolymer of claim 1 wherein the first polymer segment is an ethylene oxide/propylene oxide copolymer or poly(ethylene oxide) and the second polymer segment is polysulfone.

13. The block copolymer of claim 12 comprising 1–3 first polymer segment, each first polymer segment having an average mole fraction of monomers possessing a branch point of 0.0001 to 1 and an average molecular weight range of 5 to 200 kDa, and 1–3 second polymer segments, each second polymer segment having an average mole fraction of monomers possessing a branch point of 0 and an average molecular weight range of 20 to 200 kDa, wherein the first polymer segments are 20 to 60% by weight of the block copolymer, the second polymer segments are 40 to 80% by weight of the block copolymer.

14. A solution for preparing a polymer article, the solution comprising 0.5 to 80% by weight of the block copolymer of claim 1, and 20 to 99.5% by weight of a solvent; wherein the block copolymer molecules are dissolved in the solvent.

15. The solution of claim 14 wherein the block copolymer has a molecular weight of 5 to 1,000 kDa.

16. The solution of claim 14 wherein the block copolymer has a molecular weight of 5 to 500 kDa.

17. The solution of claim 14 wherein the solution comprises 1 to 50% by weight of the block copolymer.

18. The solution of claim 14 wherein the solution comprises 1 to 30% by weight of the block copolymer.

19. The solution of claim 14 further comprising a bulk polymer wherein the second polymer segments are miscible with the bulk polymer.

20. The solution of claim 19 wherein the bulk polymer is polycarbonate, polyolefin, polysulfone, polyethersulfone, polyetherketone, polyimide, polysulfonamide, polyamide, polyacrylonitrile, polyacrylonitrile/polyvinylchloride copolymer, poly(vinylidene fluoride), or fluoropolymer.

21. An article comprising an aggregate of block copolymer molecules, each of the block copolymer molecules having 1 to 50 first polymer segments, each first polymer segment having an average mole fraction of monomers possessing a branch point of 0.0001 to 1 and an average molecular weight range of 5 to 2,000 kDa; and 1 to 50 second polymer segments, each second polymer segment having an average mole fraction of monomers possessing a branch point of 0 to 0.5 and an average molecular weight range of 5 to 2,000 kDa, wherein the first polymer segments are 5 to 95% by weight of the block copolymer, the second polymer segments are 5 to 95% by weight of the block copolymer, the ratio of the average mole fraction of monomers possessing a branch point of the second polymer segment to that of the first polymer segment is 0 to 0.5, and the first polymer segments are more hydrophilic than the second polymer segments;

wherein the first polymer segment is poly(ethylene oxide), poly(propylene oxide), ethylene oxide/propylene oxide copolymer, poly(acrylic acid), poly(methacrylic acid), poly(acryl amide), poly(vinyl alcohol), poly(vinyl sulfonic acid), poly(styrene sulfonate), poly(vinyl phosphoric acid), poly(ethylene imine), poly(amino acid), or a mixture thereof.

22. The article of claim 21 further comprising a bulk polymer wherein the second polymer segments are miscible with the bulk polymer.

23. The article of claim 22 wherein the bulk polymer is polycarbonate, polyolefin, polysulfone, polyethersulfone, polyetherketone, polyimide, polysulfonamide, polyamide, polyacrylonitrile, polyacrylonitrile/polyvinylchloride copolymer, poly(vinylidene fluoride), or fluoropolymer.

24. The article of claim 23 wherein the bulk polymer is polysulfone or polyethersulfone and each of the second polymer segment is polysulfone or polyethersulfone.

25. A casting solution for preparing a membrane, the casting solution comprising:

2 to 60% by weight of a bulk polymer having one or more polysulfone segments;

0.05 to 80% by weight of a block copolymer having a first polymer segment of poly(ethylene oxide) or ethylene oxide/propylene oxide copolymer having an average mole fraction of monomers possessing a branch point of 0.0001 to 1 and an average molecular weight range of 5 to 200 kDa, and a second polymer segment of polysulfone having an average mole fraction of monomers possessing a branch point of 0 and an average molecular weight range of 20 to 200 kDa; and 20 to 98% by weight of a solvent;

wherein the bulk polymer has a molecular weight of 10 to 2,000 kDa, the block copolymer has a molecular weight of 20 to 150 kDa and contains 0.01 to 95% by weight of the first polymer segment, the ratio of the average mole fraction of monomers possessing a branch point of the second polymer segment to that of the first polymer segment is 0 to 0.5, and the first polymer segments are more hydrophilic than the second polymer segments.

26. The casting solution of claim 25 wherein the bulk polymer is polysulfone.

27. The casting solution of claim 25 wherein the casting solution comprises 5 to 40% by weight of the bulk polymer.

28. The casting solution of claim 25 wherein the casting solution comprises 5 to 30% by weight of the bulk polymer.

29. The casting solution of claim 25 wherein the casting solution comprises 1 to 50% by weight of the block copolymer.

30. The casting solution of claim 25 wherein the casting solution comprises 1 to 30% by weight of the block copolymer.

31. The casting solution of claim 25 wherein the solvent is aprotic and water miscible.

32. The casting solution of claim 25 wherein the solvent is N-methylpyrrolidone, formamide, dimethylformamide, dimethylsulfoxide, dimethylacetylacetamide, or 4-butyrolactone.

33. The casting solution of claim 25 wherein the bulk polymer has a molecular weight of 15 to 1,000 kDa.

34. The casting solution of claim 33 wherein the bulk polymer has a molecular weight of 20 to 750 kDa.

35. The casting solution of claim 25 wherein the block copolymer contains 5 to 70% by weight of the first polymer segment.

36. The casting solution of claim 35 wherein the block copolymer contains 10 to 50% by weight of the first polymer segment.

37. The block copolymer of claim 1 wherein the first polymer segment is poly(ethylene oxide), poly(propylene oxide), or ethylene oxide/propylene oxide copolymer in which the monomers are linked together via a divalent sulfone group.

38. The block copolymer of claim 37 wherein the divalent sulfone group is a diaryl sulfone group.

39. The block copolymer of claim 38 wherein the second polymer segment is polysulfone or polyethersulfone.

40. The block copolymer of claim 12 wherein the monomers of the first polymer segment are linked together via a diaryl sulfone group.

41. The solution of claim 14 wherein the first polymer segment is poly(ethylene oxide), poly(propylene oxide), or ethylene oxide/propylene oxide copolymer in which the monomers are linked together via a divalent sulfone group.

42. The solution of claim 41 wherein the divalent sulfone group is a diaryl sulfone group.

43. The article of claim 42 wherein the second polymer segment is polysulfone or polyethersulfone.

44. The article of claim 21 wherein the first polymer segment is poly(ethylene oxide), poly(propylene oxide), or ethylene oxide/propylene oxide copolymer in which the monomers are linked together via a divalent sulfone group.

45. The article of claim 44 wherein the divalent sulfone group is a diaryl sulfone group.

46. The article of claim 45 wherein the second polymer segment is polysulfone or polyethersulfone.

47. A block copolymer comprising
1 to 50 first polymer segments, each first polymer segment having an average mole fraction of monomers possessing a branch point of 0.0001 to 1 and an average molecular weight range of 5 to 2,000 kDa; and
1 to 50 second polymer segments, each second polymer segment having an average mole fraction of monomers possessing a branch point of 0 to 0.5 and an average molecular weight range of 5 to 2.000 kDa, wherein the first polymer segments are 5 to 95% by weight of the block copolymer, the second polymer segments are 5 to 95% by weight of the block copolymer, the ratio of the average mole fraction of monomers possessing a branch point of the second polymer segments to that of the first polymer segments is 0 to 0.5, and the first polymer segments are more hydrophilic than the second polymer segments;
wherein the second polymer segment is polycarbonate, polyolefin, polysulfone, polyethersulfone, polyetherketone, polyimide, polysulfonamide, polyamide, polyacrylonitrile, polyacrylonitrile/ polyvinychloride copolymer, poly(vinylidene fluoride), fluoropolymer, or a mixture thereof.

48. The block copolymer of claim 47 comprising 1 to 2 first polymer segments.

49. The block copolymer of claim 48 wherein at least one of the first polymer segments is terminally located.

50. The block copolymer of claim 48 comprising 1 to 2 second polymer segments.

51. The block copolymer of claim 50 wherein at least one of the second polymer segments is terminally located.

52. The block copolymer of claim 50 comprising 1 to 2 second polymer segments.

53. The block copolymer of claim 47 which has a molecular weight of 10 to 2,000 kDa.

54. The block copolymer of claim 47 wherein the first polymer segment is poly(ethylene oxide), poly(propylene oxide), or ethylene oxide/propylene oxide copolymer in which the monomers are linked together via a divalent sulfone group.

55. The block copolymer of claim 54 wherein the divalent sulfone group is a diaryl sulfone group.

56. The block copolymer of claim 55 wherein the second polymer segment is polysulfone.

57. An article comprising an aggregate of block copolymer molecules, each of the block copolymer molecules having
1 to 50 first polymer segments, each first polymer segment having an average mole fraction of monomers possessing a branch point of 0.0001 to 1 and an average molecular weight range of 5 to 2,000 kDa; and
1 to 50 second polymer segments, each second polymer segment having an average mole fraction of monomers possessing a branch point of 0 to 0.5 and an average molecular weight range of 5 to 2,000 kDa, wherein the first polymer segments are 5 to 95% by weight of the block copolymer, the second polymer segments are 5 to 95% by weight of the block copolymer, the ratio of the average mole fraction of monomers possessing a branch point of the second polymer segment to that of the first polymer segment is 0 to 0.5, and the first polymer segments are more hydrophilic than the second polymer segments;
wherein the second polymer segment is polycarbonate, polyolefin, polysulfone, polyethersulfone, polyetherketone, polyimide, polysulfonamide, polyamide, polyacrylonitrile, polyacrylonitrile/ polyvinychloride copolymer, poly(vinylidene fluoride), fluoropolymer, or a mixture thereof.

58. The article of claim 57 further comprising a bulk polymer wherein the second polymer segments are miscible with the bulk polymer.

59. The article of claim 58 wherein the bulk polymer is polycarbonate, polyolefin, polysulfone, polyethersulfone, polyetherketone, polyimide, polysulfonamide, polyamide, polyacrylonitrile, polyacrylonitrile/polyvinychloride copolymer, poly(vinylidene fluoride), or fluoropolymer.

60. The article of claim 59 wherein the bulk polymer is polysulfone and each of the second polymer segment is polysulfone.

61. The article of claim 57 wherein the first polymer segment is poly(ethylene oxide), poly(propylene oxide), or ethylene oxide/propylene oxide copolymer in which the monomers are linked together via a divalent sulfone group.

62. The article of claim 61 wherein the divalent sulfone group is a diaryl sulfone group.

63. The article of claim 62 wherein the second polymer segment is polysulfone.

64. A solution for preparing a polymer article, the solution comprising 0.5 to 80% by weight of the block copolymer of claim 47, and 20 to 99.5% by weight of a solvent, wherein the block copolymer molecules are dissolved in the solvent.

65. The solution of claim 64 wherein the block copolymer has a molecular weight of 5 to 500 kDa.

66. The solution of claim 64 wherein the solution comprises 1 to 30% by weight of the block copolymer.

67. The solution of claim 64 further comprising a bulk polymer wherein the second polymer segments are miscible with the bulk polymer.

68. The solution of claim 67 wherein the bulk polymer is polycarbonate, polyolefin, polysulfone, polyethersulfone, polyetherketone, polyimide, polysulfonamide, polyamide, polyacrylonitrile, polyacrylonitrile/polyvinylchloride copolymer, poly(vinylidene fluoride), or fluoropolymer.

69. The solution of claim 64 wherein the first polymer segment is poly(ethylene oxide), poly(propylene oxide), or ethylene oxide/propylene oxide copolymer in which the monomers are linked together via a divalent sulfone group.

70. The solution of claim 69 wherein the divalent sulfone group is a diaryl sulfone group.

71. The solution of claim 70 wherein the second polymer segment is polysulfone.

* * * * *